(12) United States Patent
Yang

(10) Patent No.: US 7,481,477 B2
(45) Date of Patent: Jan. 27, 2009

(54) REAR PACKAGE TRAY FOR HATCH BACK STYLE VEHICLES

(75) Inventor: Young Seon Yang, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 463 days.

(21) Appl. No.: 11/300,164

(22) Filed: Dec. 13, 2005

(65) Prior Publication Data
US 2007/0114808 A1 May 24, 2007

(30) Foreign Application Priority Data
Nov. 18, 2005 (KR) .................. 10-2005-0110685

(51) Int. Cl.
B60R 27/00 (2006.01)
(52) U.S. Cl. .............. 296/37.16; 296/37.8; 224/400
(58) Field of Classification Search ............ 296/26.08, 296/26.09, 37.1, 37.5, 37.6, 37.8, 37.16; 224/42.32, 281, 400, 401
See application file for complete search history.

(56) References Cited

U.S. PATENT DOCUMENTS 3,534,892 A * 10/1970 Truelove, Sr. ............... 224/401
5,927,783 A * 7/1999 Baka ......................... 296/37.6
6,705,656 B2 * 3/2004 Keller ...................... 296/26.09
6,773,046 B2 * 8/2004 Nakamitsu et al. ........ 296/37.16
2005/0205628 A1 * 9/2005 Lehmann .................... 224/401

FOREIGN PATENT DOCUMENTS

JP 2000-177491 6/2000
JP 2001-328488 11/2001

* cited by examiner

*Primary Examiner*—Lori L Lyjak
(74) *Attorney, Agent, or Firm*—Morgan, Lewis & Bockius LLP

(57) ABSTRACT

A rear package tray for hatch back style vehicles is mounted in a trunk compartment of the vehicle such that the rear package tray can be slid back and forth, and can be assembled and disassembled as occasion demands. The rear package tray includes sliding rails fixed to opposite side panels of a trunk compartment of the vehicle, respectively; package tray panels positioned at the sliding rails at opposite ends thereof, connection members mounted at the front and rear ends of the package tray panels, respectively, and utility bars fixed to opposite side parts of the lower surfaces of the package tray panels at opposite ends thereof, each of the utility bars being formed in the shape of a "U."

8 Claims, 9 Drawing Sheets

- -PRIOR ART- -

REAR PACKAGE TRAY FOR HATCH BACK STYLE VEHICLES

CROSS-REFERENCE TO RELATED APPLICATION

This application claims priority to and the benefit of Korean Patent Application 10-2005-0110685 filed in the Korean Intellectual Property Office on Nov. 18, 2005, the entire content of which is incorporated herein by reference.

BACKGROUND OF THE INVENTION

1. Field of the Invention

The present invention relates to a rear package tray for vehicles, and, more particularly, to a rear package tray for hatch back style vehicles, which is mounted in a trunk compartment of the vehicle such that the rear package tray can be slid back and forth, and is easily and conveniently assembled and disassembled as occasion demands.

2. Description of the Related Art

Generally, a rear package tray for vehicles is mounted at the rear of a rear seat of the vehicle for supporting the rear seat while isolating the interior of the vehicle from a trunk compartment of the vehicle.

FIG. 1 is an exploded perspective view illustrating the structure of a conventional rear package tray for vehicles. As shown in FIG. 1, the conventional rear package tray comprises: a package tray panel 2 for isolating the interior of the vehicle from a trunk compartment; a rear window outer frame 1 attached to the front part of the package tray panel 2; and a lower tray panel 3 welded to the rear part of the package tray panel 2 for mitigating impact transmitted from a bumper (not shown).

In a hatch back style vehicle using the rear package tray with the above-stated construction, articles are loaded into the upper space of the package tray panel 2. Consequently, when one or more articles of great bulk are to be loaded, it is difficult to load the articles by only using the upper space of the package tray panel 2.

SUMMARY OF THE INVENTION

Therefore, the present invention has been made in view of the above problems, and it is an object of the present invention to provide a rear package tray for hatch back style vehicles, which is mounted in a trunk compartment of the vehicle such that the rear package tray can be slid back and forth, and is easily and conveniently assembled and disassembled as occasion demands.

It is another object of the present invention to provide a rear package tray for hatch back style vehicles, which can be separated from the trunk compartment and then stored in the lower part of a luggage compartment when the rear package tray is not in use.

In accordance with the present invention, the above and other objects can be accomplished by the provision of a rear package tray for hatch back style vehicles, comprising: sliding rails fixed to opposite side panels of a trunk compartment of the vehicle, respectively; package tray panels positioned at the sliding rails at opposite ends thereof, each of the package tray panels being formed in the shape of a plate; connection members mounted at the front and rear ends of the package tray panels, respectively; and utility bars fixed to opposite side parts of the lower surfaces of the package tray panels at opposite ends thereof, each of the utility bars being formed in the shape of a "U."

It is preferable that the sliding rails be fixed to the middle parts of the opposite side panels, respectively, and each of the package tray panels have a lateral width not greater than half the length of each of the sliding rails. Also, it is preferable that the sliding rails extend from a luggage compartment of the vehicle to the sides of the rear seat of the vehicle.

It is preferable that the connection members include: fixing grooves formed at the front end of one of the package tray panels; and connection rods, formed in the shape of a "T," each of which has one end mounted to each side part of the rear end of the other package tray panel via a rotary shaft and other end fixedly fitted in the corresponding fixing groove. Also, it is preferable that each of the fixing grooves includes an insertion part and a connection supporting part, and each of the fixing grooves is formed in the sectional shape of an inverted "T."

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

The present invention is used to load one or more articles of great bulk or various kinds of luggage into a storage box using a rear package tray.

Figure 1:
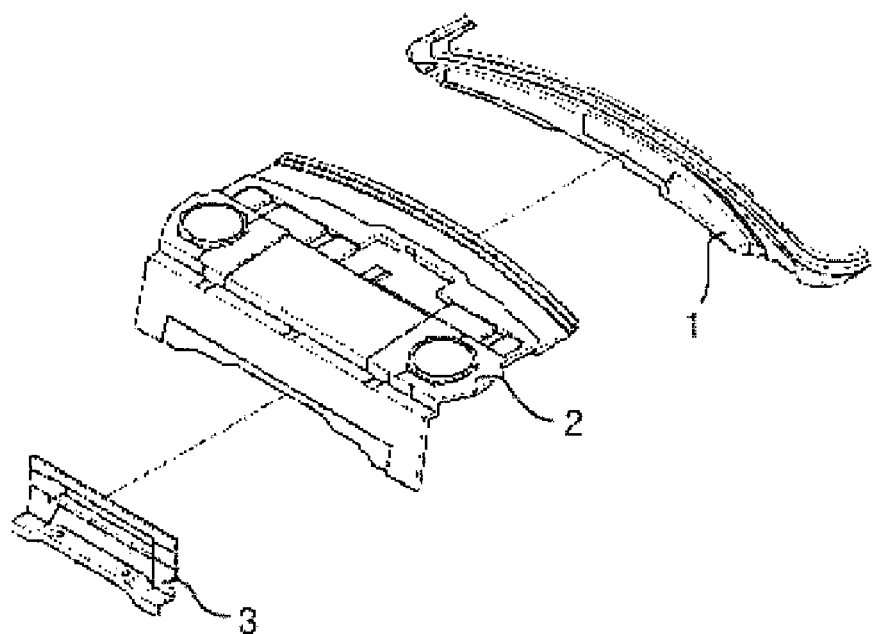
FIG. 1 is an exploded perspective view illustrating the structure of a conventional rear package tray for vehicles.
Figure 2A:
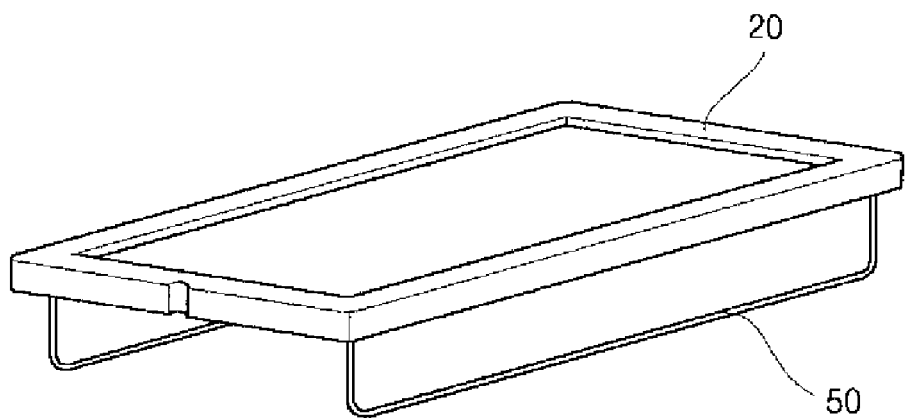
FIG. 2A is a perspective view illustrating the structure of a package tray panel used in the present invention.
Figure 2B:
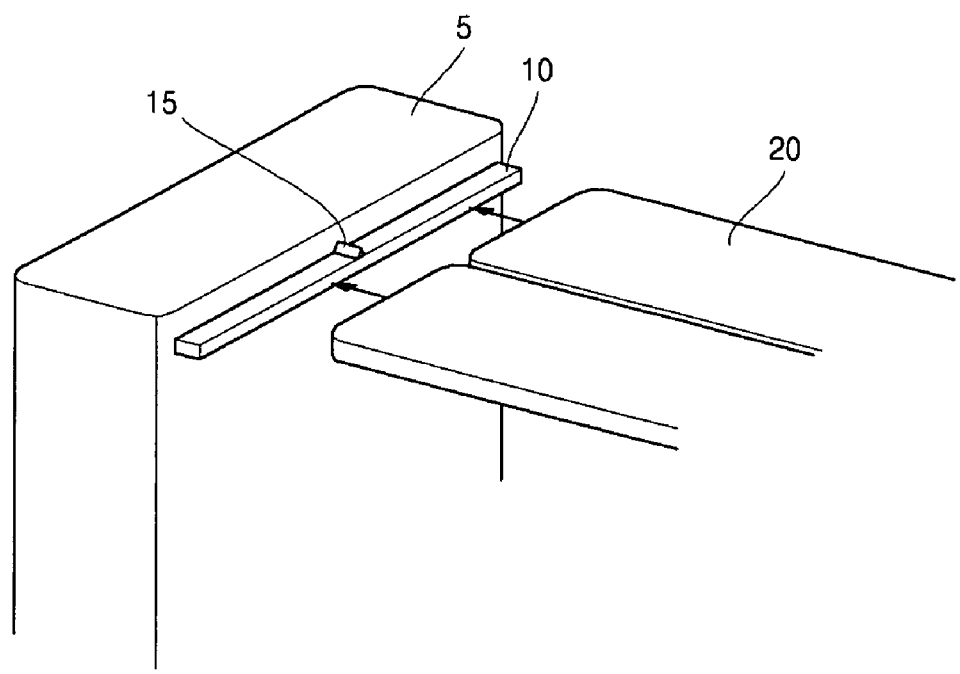
FIGS. 2B and 2C are perspective views illustrating the connection between the package tray panels and sliding rails used in the present invention, respectively.
Figure 2C:
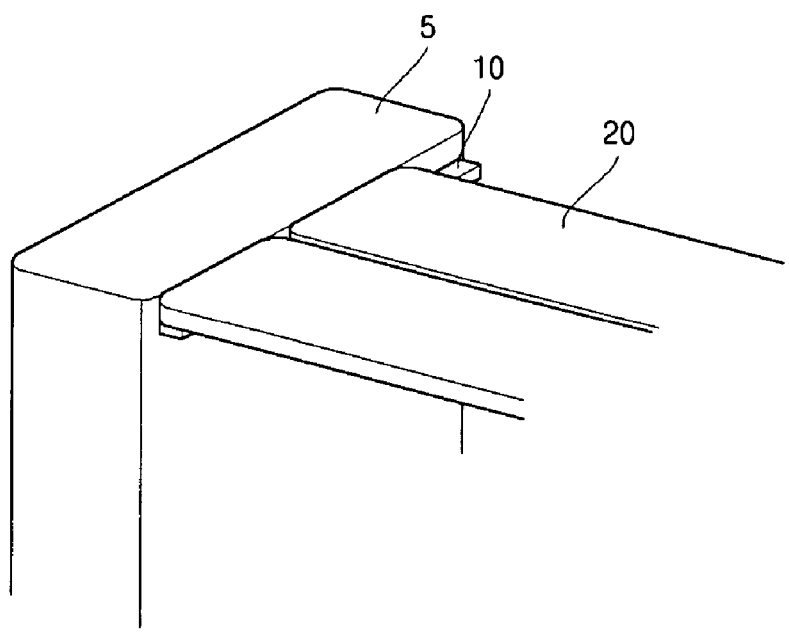

FIG. 2A is a perspective view illustrating the structure of a package tray panel used in the present invention, and FIGS. 2B and 2C are perspective views illustrating the connection between the package tray panels and sliding rails used in the present invention, respectively.

To mount a rear package tray according to the present invention in a trunk compartment of a hatch back style vehicle, sliding rails 10 are horizontally fixed to opposite side panels 5 of the trunk compartment, respectively.

After the sliding rails 10 are fixed to the opposite side panels 5, opposite ends of each package tray panel 20 are positioned at the tops of the sliding rails 10. At this time, it is preferable that a fixing protrusion 15 be formed at the middle of each of the sliding rails 20 to prevent the package tray panels 20 from being slid in the forward-to-backward direction of the sliding rails 10 after the package tray panels 20 are positioned at the tops of the sliding rails 10.

At the lower parts of the package tray panels 20 are mounted utility bars 50, respectively. It is preferable that the utility bars 50 are folded when the utility bars 50 are not in use such that the utility bars 50 do not collide with other articles in the vehicle.

The lateral width of each package tray panel 20 is not greater than half the length of each sliding rail 10. Consequently, the number of the package tray panels 20 may be appropriately changed based on the purpose of use.

Now, the use of the rear package tray according to the present invention based on the purpose of use will be described in detail with reference to FIGS. 3A to 5B.

Figure 3A:
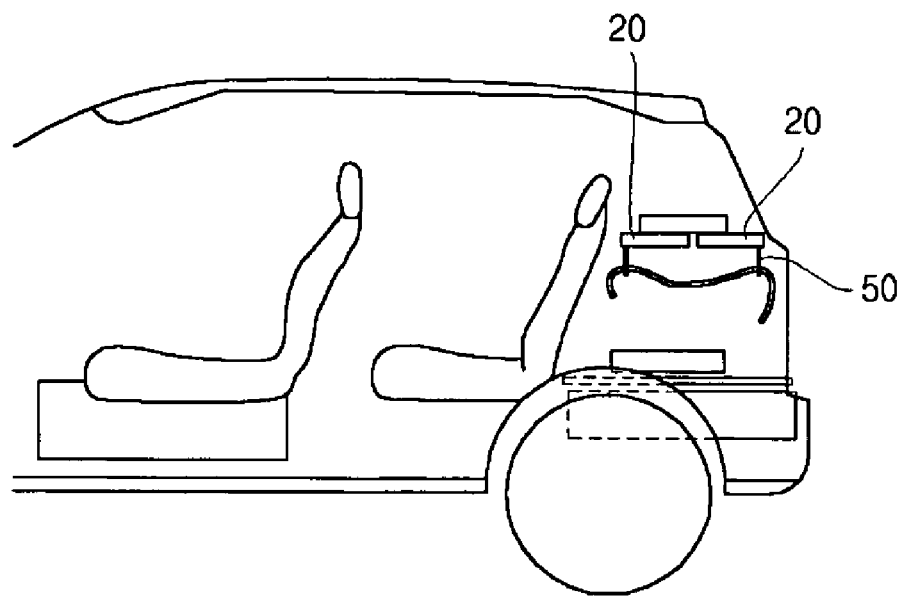
FIGS. 3A to 3F are views illustrating the use of a rear package tray for vehicles according to the present invention, respectively.

As shown in FIG. 3A, the rear package tray according to the present invention is used as a dress utility bar. When the dress is long, the utility bars 50, which are mounted at the lower parts of the package tray panels 20, respectively, are unfolded such that the upper and lower ends of the dress are hung on the utility bars 50, respectively.

Figure 3B:
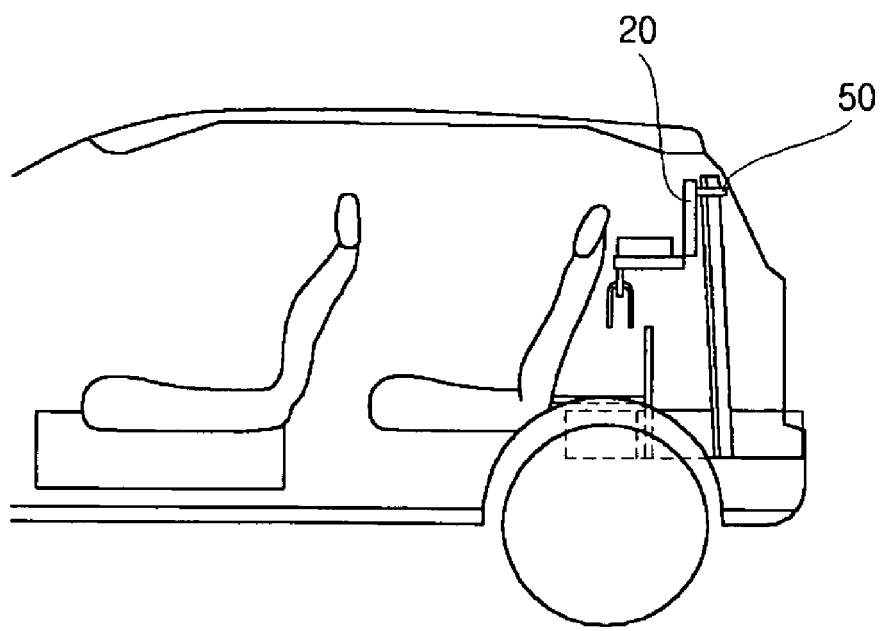

When the rear package tray according to the present invention is used to hang a dress, the rear package tray is utilized as follows, since the dress takes various shapes. When the dress is short as shown in FIG. 3B, hangers are hung on the utility bars 50 of the package tray panels 20 while the package tray panels 20 are folded.

Figure 3C:
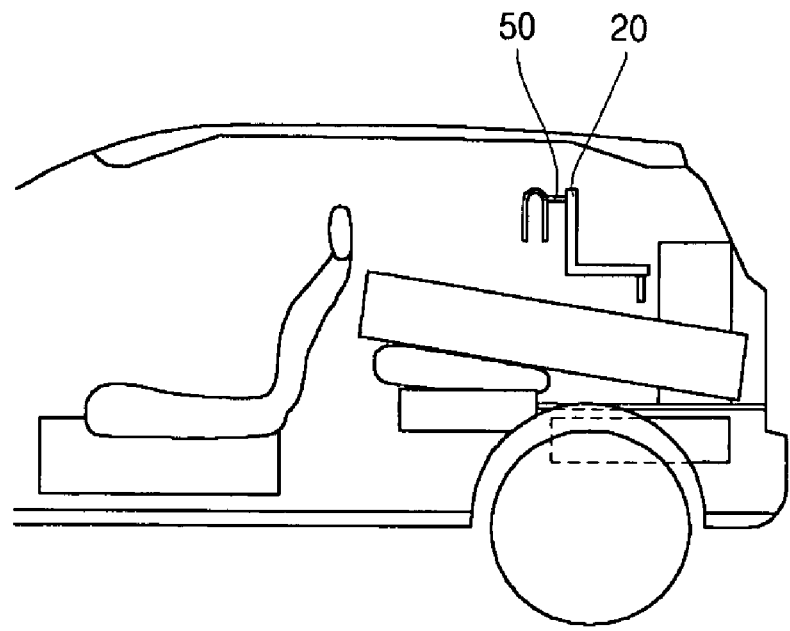

When a long article, i.e., an article having a great longitudinal length, is loaded in a luggage compartment of the vehicle, as shown in FIG. 3C, the rear seat is folded to secure a luggage loading space because it is not possible to load the article in the luggage compartment. Subsequently, the package tray panels 20 are located at the tops of the sliding rails 10 while the package tray panels 20 are arranged in the shape of an "L," such that the package tray panels 20 are positioned as shown in FIG. 3C. As a result, it is possible to load the long article.

As shown in FIG. 3C, the utility bars 50, which are mounted at the lower parts of the package tray panels 20, respectively, are unfolded such that hangers can be hung on the utility bars 50, although the utility bars 50 may be maintained folded.

The fixing protrusions 15 are formed at the upper surfaces of the sliding rails 10, respectively, as shown in FIG. 2C, to prevent the package tray panels 20 from being slid back and forth. Consequently, although the vehicle is stopped abruptly, the package tray panels 20 are effectively prevented from moving along the sliding rails 10.

As shown in FIG. 3C, the package tray panels 20 are connected to each other such that the connected package tray panels 20 can be folded. To this end, the package tray panels 10 are constructed as follows.

Figure 4A:
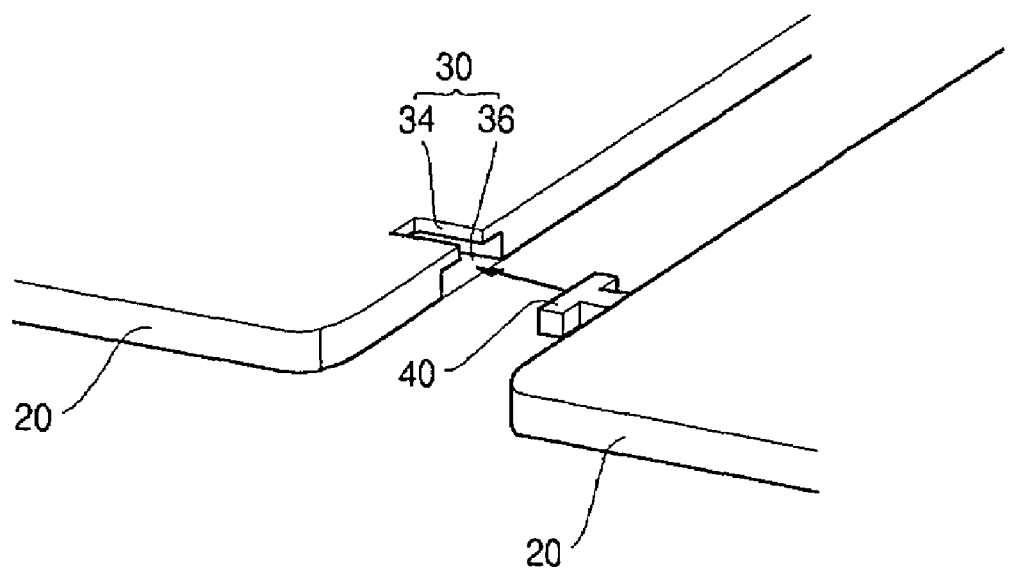
FIGS. 4A to 4F are views illustrating the assembly of the package tray panels used in the present invention, respectively.
Figure 4B:
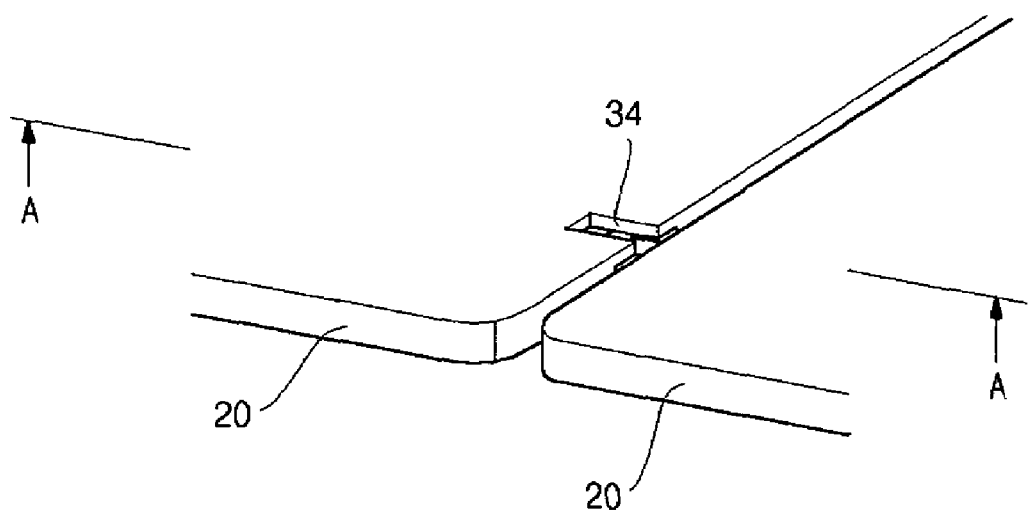

As shown in FIGS. 4A and 4B, one end of each T-shaped connection rod 40 is mounted to each side part of the rear end of one of the package tray panels 20 via a rotary shaft, and fixing grooves 30 are formed at opposite side parts of the front end of the other package tray panel 20, which is positioned at the front part of the trunk compartment. The other end of each connection rod 40 is inserted into the corresponding fixing groove 30 such that the two package tray panels 20 are connected to each other.

Figure 4C:
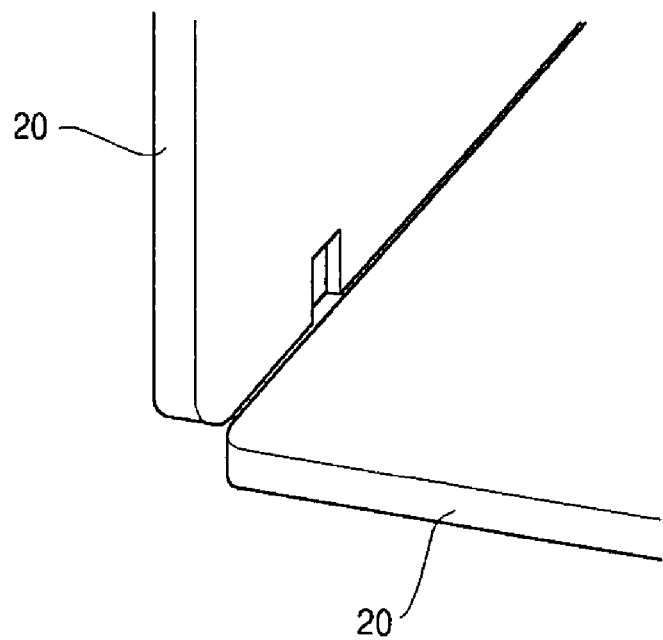

When the package tray panel 20, at which the fixing grooves 30 are formed, is rotated relative to the package tray panel 20, to which the connection rods 40 are connected, while the connection rods 40 are fitted in the fixing grooves 30, respectively, the connection rods 40 are rotated about the rotary shafts. As a result, the package tray panel 20, at which the fixing grooves 30 are formed, is vertically positioned as shown in FIG. 4C. At this time, it is preferable to round the edges of the upper and lower surfaces of the package tray panels 20 in order to facilitate the folding operation of the package tray panels 20.

Figure 4D:
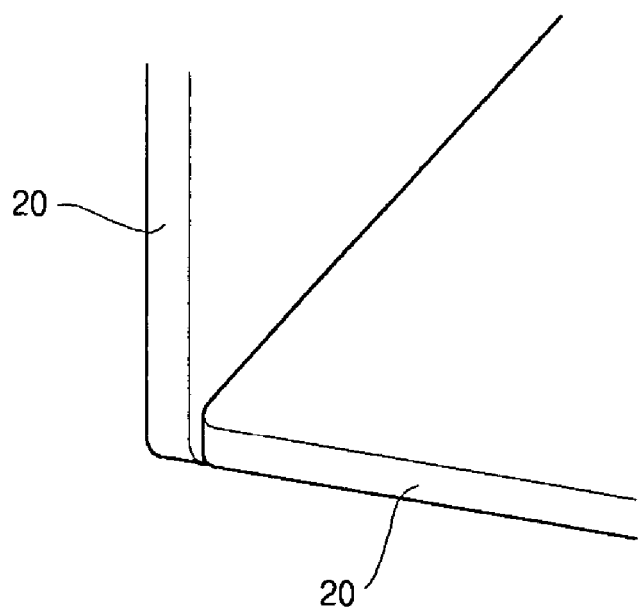
Figure 4E:
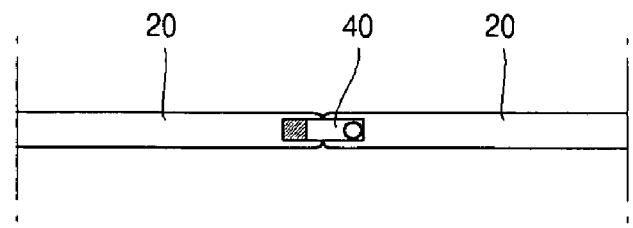

Specifically, each of the fixing grooves 30 includes an insertion part 36, which is formed with the same width as the upper part of each of the T-shaped connection rods 40, and a connection supporting part 34, which is formed with the same width as the middle part of each of the connection rods 40. The insertion part 36 and the connection supporting part 34 are vertically formed in succession, and therefore, each of the fixing grooves 30 is formed in the sectional shape of an inverted "T." When the one of the package tray panels 20 are vertically positioned, while the connection rods 40 are fitted in the corresponding fixing grooves 30 through the insertion parts 36, and then the vertically positioned package tray panel 20 is pushed downward, the package tray panels 20 are coupled with each other as shown in FIG. 4D.

Figure 3D:
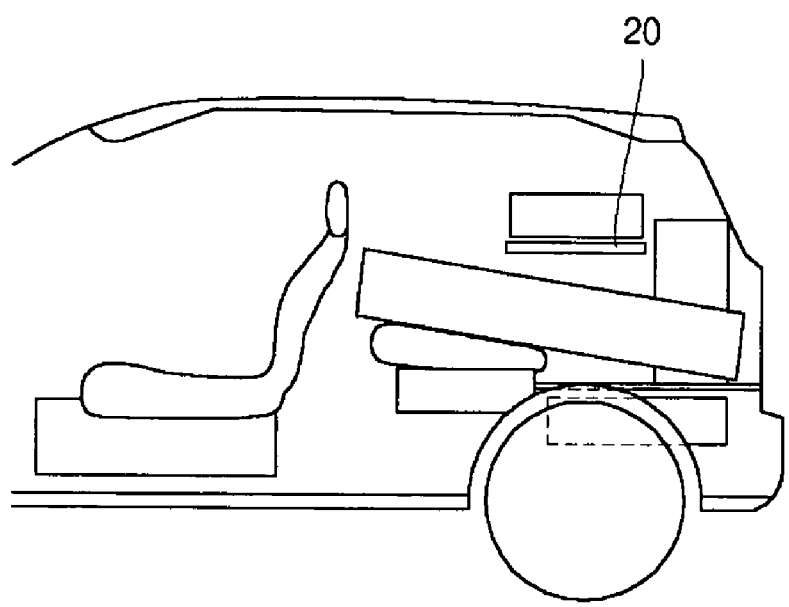

The package tray panels are coupled with each other as described above, and therefore, when a long article is to be loaded in the luggage compartment as shown in FIG. 3D, the rear seat is folded to secure the luggage loading space. Also, an article having a width greater than the lateral width of the luggage compartment can be loaded in the rear part of the luggage compartment.

That is to say, when the package tray panels 20 are horizontally connected to each other, and are then positioned at the tops of the sliding rails 10 while one or more large-sized pieces of luggage are loaded in the luggage compartment, other articles can be loaded on the package tray panels 20 in addition of the luggage loaded in the luggage compartment. Consequently, the total loading amount of luggage is increased.

Also, the package tray panels 20 are basically positioned at the tops of the sliding rails 10 at the luggage compartment side. However, the sliding rails 10 extend from the luggage compartment of the vehicle to the sides of the rear seat of the vehicle, and therefore, when one or more large-sized pieces of luggage are to be loaded in the luggage compartment, the package tray panels 20 are placed on the tops of the sliding rails 20 adjacent to the sides of the rear seat of the vehicle such that the large-sized pieces of luggage can be loaded in the luggage compartment, and all the space above the sliding rails 10 can be used as luggage loading space. 1

Figure 3E:
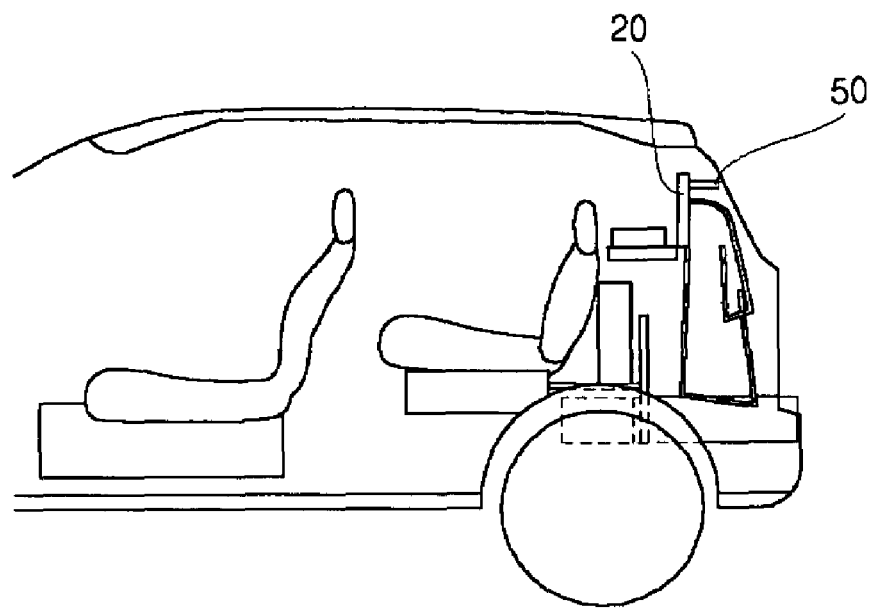

Dress may be hung while luggage is loaded, as shown in FIG. 3E. As shown in FIG. 3E, the package tray panels 20 are positioned at the tops of the sliding rails 10, while the package tray panels 20 are connected to each other in the shape of a "]" using the connection rods 40, such that the luggage is loaded below one of the package tray panels 20, which is horizontally positioned, and the dress is hung on the utility bar 50 of the other package tray panel 20, which is vertically positioned. At this time, the package tray panels 20 may be positioned at the tops of the sliding rails adjacent to the rear seat of the vehicle depending upon the size of the luggage to be loaded.

Figure 3F:
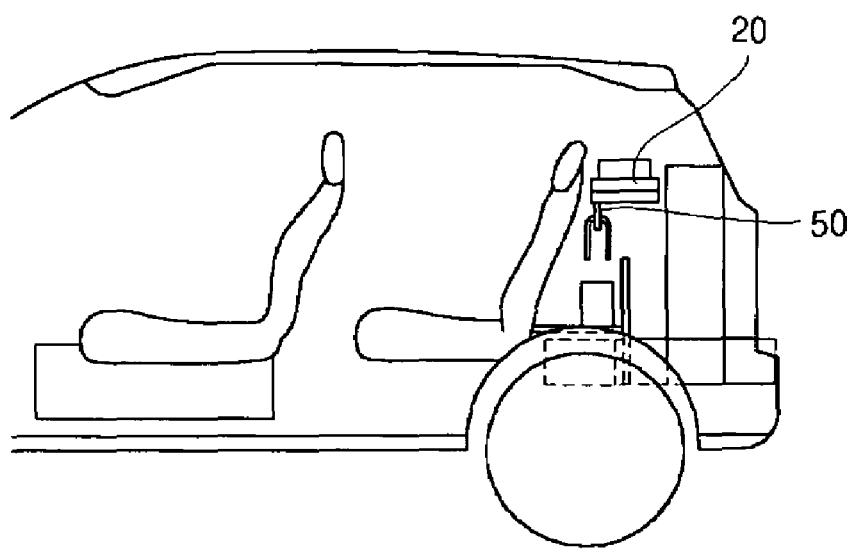

When one or more small-sized articles and one or more long articles are to be loaded at the same time, as shown in FIG. 3F, the package tray panels 20 are positioned at the tops of the sliding rails 10 while the package tray panels 20 fully overlap with each other.

Figure 4F:
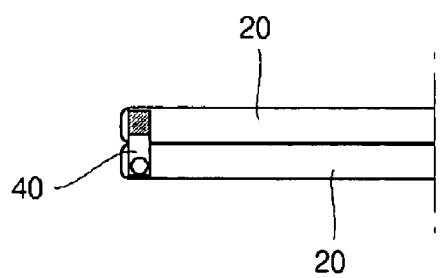

The connection rods 40 are mounted to one of the package tray panels 20 via the rotary shafts 40. Consequently, the package tray panels 20 are folded, as shown in FIG. 4F, while the ends of the connection rods 40 are fitted in the corresponding fixing grooves 30, and then the folded package tray panels 20 are positioned at the tops of the sliding rails 10.

As a result, as shown in FIG. 3F, articles can be placed on the package tray panels 20 while articles having various sizes are loaded in the luggage compartment of the vehicle.

In addition to the luggage loading methods as described above, various kinds of luggage can be also loaded based on the connection between the package tray panels and the utility bars.

When luggage is not loaded in the vehicle, sudden vibrations are applied to the package tray panels 20 while the vehicle is driven, and as a result, the package tray panels 20 may fall off the sliding rails 10. For this reason, it is preferable that the package tray panels 20 be stored in the lower part of the luggage compartment of the vehicle while the package tray panels 20 are folded as shown in FIG. 4F.

Figure 5A:
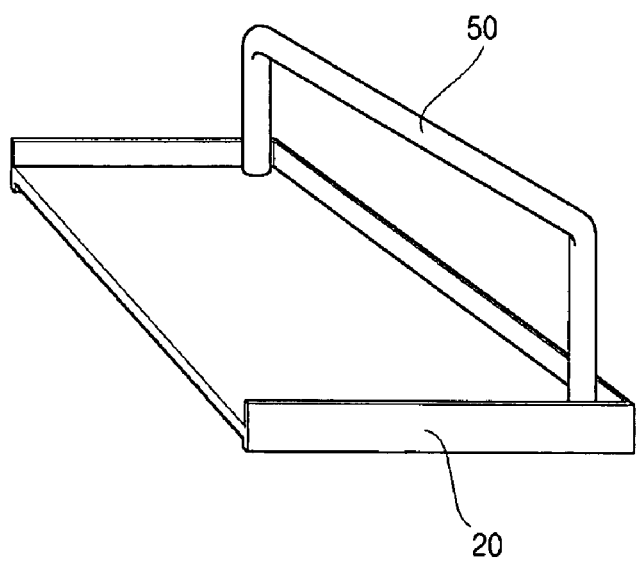
FIGS. 5A and 5B are views illustrating the use of a utility bar mounted at the package tray panel used in the present invention, respectively.
Figure 5B:
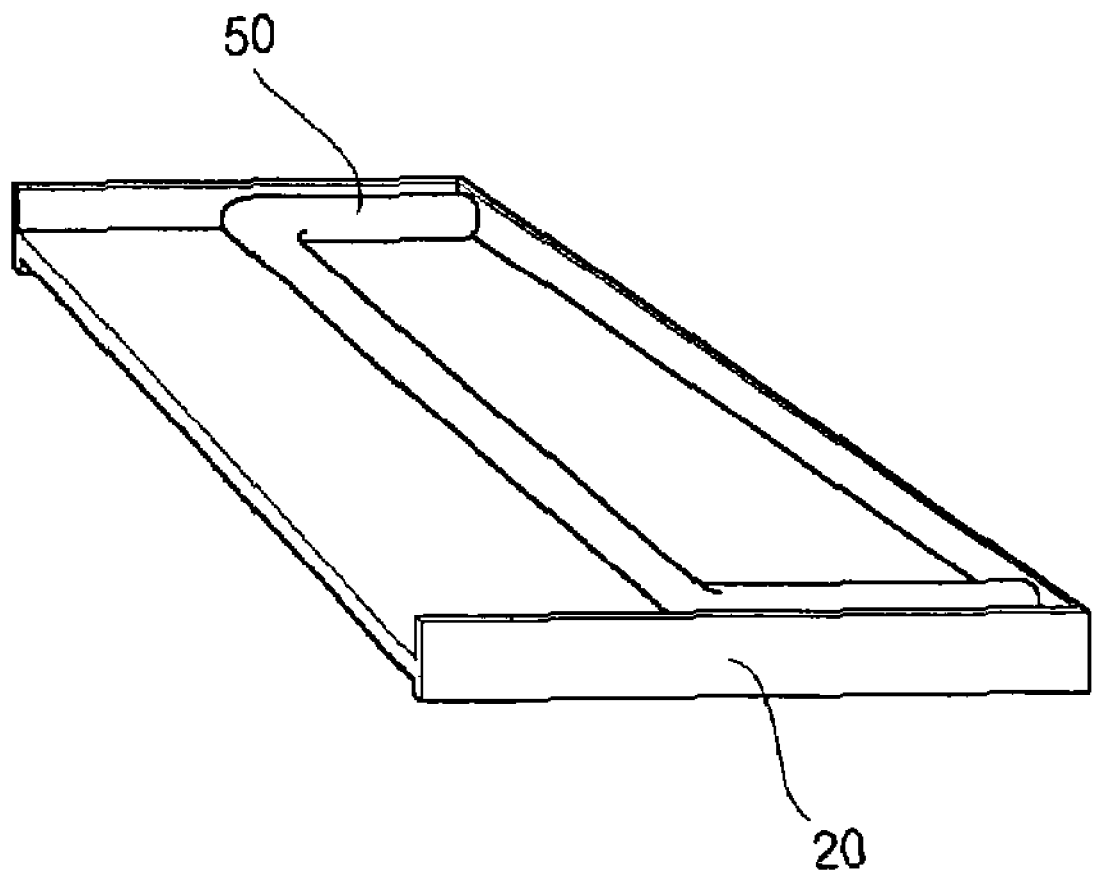

The utility bar 50 of each of the package tray panels 20 is constructed such that the utility bar 50 can be folded and unfolded as shown in FIGS. 5A and 5B, and therefore, luggage can be loaded in various fashions. The utility bars 50 of the package tray panels 20 can be efficiently utilized especially when a dress is to be hung.

As apparent from the above description, the rear package tray for hatch back style vehicles according to the present invention is mounted in the trunk compartment of the vehicle such that the rear package tray can be slid back and forth, and is easily and conveniently assembled and disassembled as occasion demands. Consequently, the present invention has the effect of loading luggage having various sizes.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A rear package tray for hatch back style vehicles, comprising:
    sliding rails fixed to opposite side panels of a trunk compartment of the vehicle, respectively;
    package tray panels positioned at the sliding rails at opposite ends thereof, each of the package tray panels being formed in the shape of a plate;
    connection members mounted at the front and rear ends of the package tray panels, respectively; and
    utility bars fixed to opposite side parts of the lower surfaces of the package tray panels at opposite ends thereof, each of the utility bars being formed in the shape of a "U."

2. The rear package tray as set forth in claim 1, wherein the sliding rails are horizontally fixed to the middle parts of the opposite side panels, respectively.

3. The rear package tray as set forth in claim 1, wherein the sliding rails extend from a luggage compartment of the vehicle to the sides of the rear seat of the vehicle.

4. The rear package tray as set forth in claim 1, wherein the sliding rails are provided at the upper surfaces thereof with fixing protrusions, respectively, for preventing the package tray panels from moving back and forth.

5. The rear package tray as set forth in claim 1, wherein each of the package tray panels has a lateral width not greater than half the length of each of the sliding rails.

6. The rear package tray as set forth in claim 1, wherein the connection members include:
    fixing grooves formed at the front end of one of the package tray panels; and
    connection rods, formed in the shape of a "T," each of which has one end mounted to each side part of the rear end of the other package tray panel via a rotary shaft and other end fixedly fitted in the corresponding fixing groove.

7. The rear package tray as set forth in claim 6, wherein each of the fixing grooves includes:
    an insertion part, which is formed with the same width as the upper part of each of the connection rods; and
    a connection supporting part, which is formed with the same width as the middle part of each of the connection rods, the insertion part and the connection supporting part being vertically formed in succession, whereby each of the fixing grooves is formed in the sectional shape of an inverted "T."

8. The rear package tray as set forth in claim 1, wherein the utility bars are mounted at the lower part of the package tray panels such that the utility bars can be folded and unfolded.

* * * * *